(12) United States Patent
Yamaguchi

(10) Patent No.: US 6,693,510 B1
(45) Date of Patent: Feb. 17, 2004

(54) IMAGE COMMUNICATION TERMINAL, IMAGE COMMUNICATION SYSTEM, AND MOBILE STATION

(75) Inventor: Kentoku Yamaguchi, Hachioji (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/514,640

(22) Filed: Feb. 29, 2000

(30) Foreign Application Priority Data

Mar. 1, 1999 (JP) ............................................ 11-052336

(51) Int. Cl.[7] ................................................ G08B 5/22
(52) U.S. Cl. ................ 340/7.2; 340/7.22; 340/7.51; 340/7.52; 340/7.53; 340/7.55; 340/7.56; 455/412.1; 455/566; 455/557; 379/100.1; 379/100.15; 379/100.16; 348/14.02; 348/14.04; 358/1.16; 358/405
(58) Field of Search ................ 340/7.2, 7.22, 340/7.51, 7.52, 7.53, 7.55, 7.56; 455/412, 566, 575, 557; 379/100.16, 100.15, 100.01; 358/405, 1.16, 404, 440; 348/14.02, 14.04, 14.14

(56) References Cited

U.S. PATENT DOCUMENTS

| 5,018,186 A | | 5/1991 | Kimura et al. ............. 379/153 |
| 5,200,836 A | * | 4/1993 | Koizumi ..................... 386/104 |
| 5,297,146 A | * | 3/1994 | Ogawa ........................ 370/522 |
| 5,345,258 A | | 9/1994 | Matsubara et al. ....... 348/14.06 |
| 5,745,257 A | * | 4/1998 | Kato et al. .................. 358/440 |
| 5,890,073 A | * | 3/1999 | Fukawa ....................... 455/557 |

FOREIGN PATENT DOCUMENTS

| EP | 0 624 986 A1 | 11/1994 |
| JP | 3-201649 | 3/1991 |

* cited by examiner

Primary Examiner—Michael Horabik
Assistant Examiner—Yves Dalencourt
(74) Attorney, Agent, or Firm—Finnegan, Henderson, Farabow, Garrett & Dunner, L.L.P.

(57) ABSTRACT

An image communication terminal having a reception section for receiving a paging signal and image data based on the paging signal, a storage section for storing data, and a control section for controlling to store the image data based on the paging signal in the storage section when a predetermined mode is set.

18 Claims, 6 Drawing Sheets

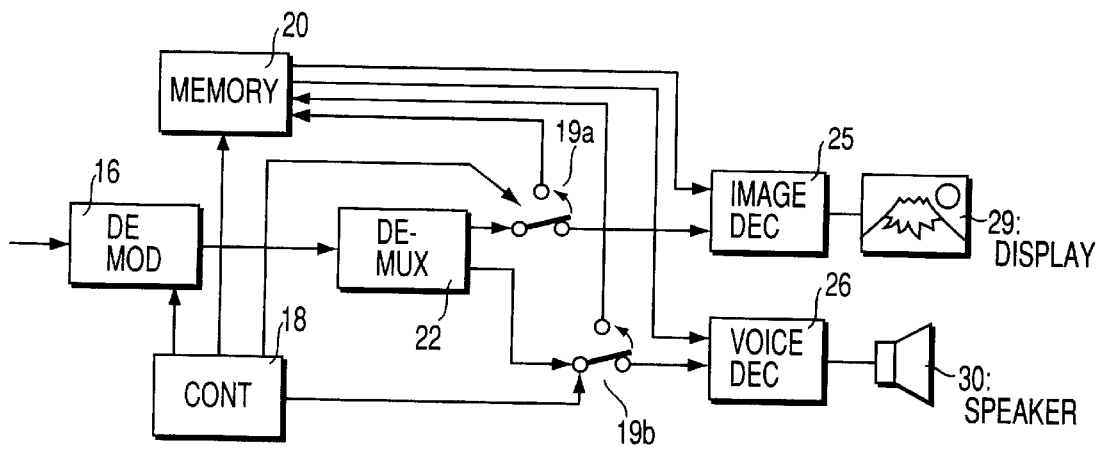
FIG. 4
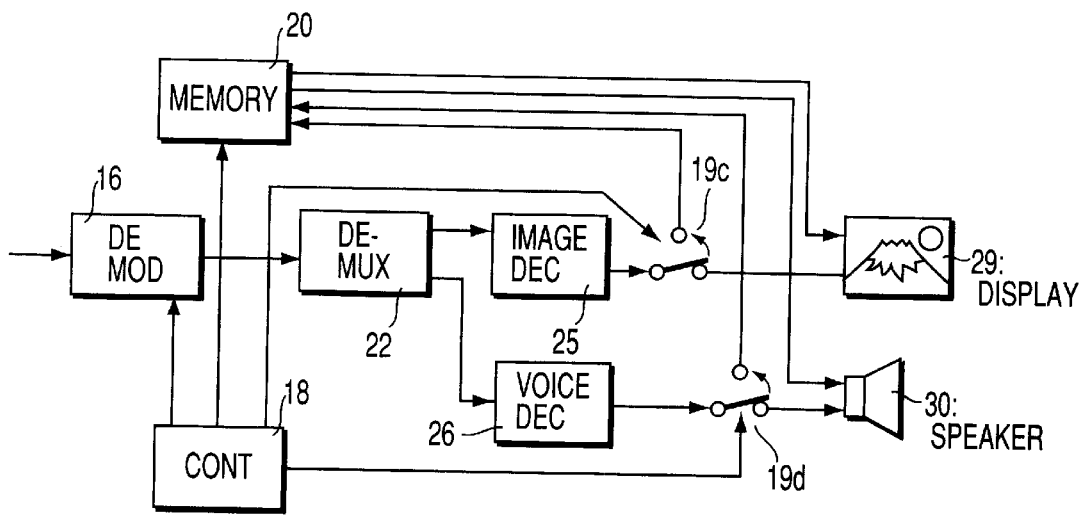
FIG. 5
| TEL. NO | NAME | RESPONSE IMAGE | REPLY MESSAGE | GROUP |
|---|---|---|---|---|
| 123··· | A | ☹ | HOW ARE YOU ? | PRIVATE |
| 456··· | B | ☹ | HOW ARE YOU ? | PRIVATE |
| 789··· | C | ☹ | THIS IS ☐☐ | BUSINESS |
| 012··· | D | ☹ | THIS IS ☐☐ | BUSINESS |
FIG. 6

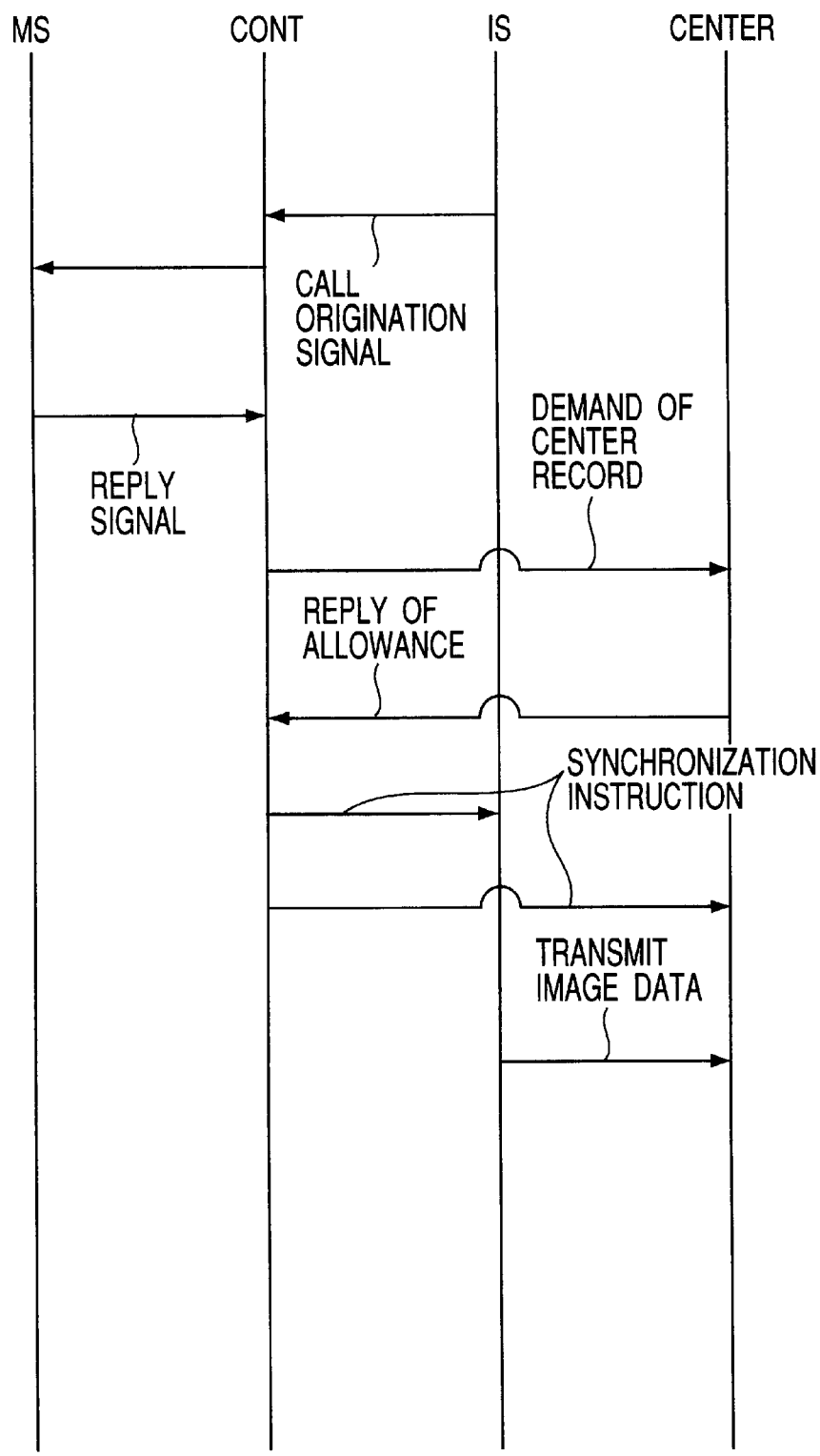
F I G. 9

IMAGE COMMUNICATION TERMINAL, IMAGE COMMUNICATION SYSTEM, AND MOBILE STATION

CROSS-REFERENCE TO RELATED APPLICATION

This application is based upon and claims the benefit of priority from the prior Japanese Patent Application No. 11-052336, filed Mar. 1, 1999, the entire contents of which are incorporated herein by reference.

BACKGROUND OF THE INVENTION

The present invention relates to an image communication terminal, image communication system, and mobile station.

An image communication terminal is manufactured as a terminal capable of communicating not only voice data but also image data. When a terminal user responds to a call and requests an image stored in a server, image data transmitted from the server is reproduced on a display.

For example, if the terminal user is away from the terminal, or even near the terminal, he/she cannot respond to a call during meeting, the transmitted image cannot be received and reproduced. Additionally, if transmission is disabled, the transmitting side must call again.

Especially, the image communication terminal does not have a function that meets a request for allowing an information receiver to watch image data not at real time but later at his/her convenient time.

As described above, the conventional image communication terminal has no function of storing transmitted image data unless the terminal user responds to the call, resulting in inconvenience for the receiving-side user. Additionally, if transmission is disabled, the transmitting side must call again. Furthermore, the image communication terminal cannot meet a request on the transmitting side, i.e., a request for allowing the information receiving side to watch image data later at a convenient time.

BRIEF SUMMARY OF THE INVENTION

It is an object of the present invention to provide an image communication terminal which allows a terminal user who cannot respond to a call to confirm transmitted image data later, an image communication system for realizing the image communication terminal, and a mobile station having this function.

In order to achieve the above object, according to the first aspect of the present invention, there is provided an image communication terminal comprising:

reception means for receiving a paging signal and image data associated with the paging signal;

setting means for setting a predetermined mode to store the image data received by the reception means;

storage means for storing data; and control means for storing the received image data in the storage means when the predetermined mode is set by the setting means.

According to the second aspect of the present invention, there is provided a terminal according to first aspect, further comprising detection means for detecting a communication mode included in the received paging signal, wherein the control means stores the received image data in the storage means in accordance with a method corresponding to the detected communication mode.

According to the third aspect of the present invention, there is provided a terminal according to first aspect, wherein the control means stores voice data corresponding to the received image data in the storage means.

According to the fourth aspect of the present invention, there is provided terminal according to second aspect, wherein the control means stores voice data corresponding to the received image data in the storage means.

According to the fifth aspect of the present invention, there is provided a terminal according to third aspect, wherein the control means stores, in the storage means, the received image data and the voice data in a multiplexed state.

According to the sixth aspect of the present invention, there is provided a terminal according to fourth aspect, wherein the control means stores, in the storage means, the received image data and the voice data in a multiplexed state.

According to the seventh aspect of the present invention, there is provided a terminal according to fourth aspect, further comprising demultiplexing means for demultiplexing the received image data and the voice data, and detecting means for detecting timing data representing a temporal relationship between the demultiplexed image data and voice data, wherein the control means stores, in the storage means, the demultiplexed image data, voice data, and the detected timing data.

According to the eighth aspect of the present invention, there is provided a terminal according to third aspect, further comprising demultiplexing means for demultiplexing the received image data and the voice data, and detecting means for detecting timing data representing a temporal relationship between the demultiplexed image data and voice data, wherein the control means stores, in the storage means, the demultiplexed image data, voice data, and the detected timing data.

According to the ninth aspect of the present invention, there is provided a terminal according to seventh aspect, wherein the demultiplexed image data and voice data are encoded.

According to the 10th aspect of the present invention, there is provided a terminal according to 7th aspect, further comprising means for decoding the demultiplexed image data and the voice data, wherein the control means stores the decoded demultiplexed image data and the voice data in the storage means.

According to the 11th aspect of the present invention, there is provided a terminal according to 8th aspect, wherein the demultiplexed image data and voice data are encoded.

According to the 12th aspect of the present invention, there is provided a terminal according to 8th aspect, further comprising means for decoding the demultiplexed image data and the voice data, wherein the control means stores the decoded demultiplexed image data and the voice data in the storing means.

According to the 13th aspect of the present invention, there is provided a terminal according to second aspect, wherein the detection means detects a compression method of the received image data based on the detected communication mode, and the control means decodes the received image data based on the detected compression method.

According to the 14th aspect of the present invention, there is provided a terminal according to first aspect, further comprising determination means for determining whether a data amount of the received image data associated with the paging signal is larger than a remaining capacity of the storage means, and request means for requesting a center for storing image data to store the image data associated with the paging signal when the determination means determines that the data amount of the image data is larger than the remaining capacity of the storage means.

According to the 15th aspect of the present invention, there is provided a terminal according to first aspect, further comprising telephone directory storage means for storing telephone numbers and response image corresponding to each of the telephone numbers, extraction means for extracting a telephone number of a calling party from the received paging signal, and transmission means for transmitting one of the stored response images corresponding to the extracted telephone number.

According to the 16th aspect of the present invention, there is provided a terminal according to first aspect, further comprising determination means for determining whether the image data associated with the paging signal is a still image or a moving image based on the received paging signal based on the received paging signal, and transmission means for transmitting a response image based on the determined type of image data associated with the paging signal.

According to the 17th aspect of the present invention, there is provided a mobile station comprising:

reception means for receiving a paging signal and image data associated with the paging signal;

setting means for setting a predetermined mode to store the image data received by the reception means;

storage means for storing data; and control means for storing the received image data in the storage means when the predetermined mode is set by the setting means.

According to the 18th aspect of the present invention, there is provided an image communication system comprising:

a mobile station; and a center for storing data, wherein the mobile station comprises reception means for receiving a paging signal and image data associated with the paging signal, setting means for setting a predetermined mode to store the image data received by the reception means;

storage means for storing data, determination means for determining whether a data amount of the received image data is larger than a remaining capacity of the storage means, and request means for requesting the center for storing image data to store the received image data when the determination means determines that the data amount of the image data is larger than the remaining capacity of the storage means, and the center comprises storage means for, when the request means requests to store the image data associated with the paging signal, storing the received image data.

According to the 19th aspect of the present invention, there is provided an image communication system comprising:

an image station;

a mobile station;

a control station for controlling the system; and a center for storing data, wherein the control station comprises means for receiving a first request from the mobile station for storing an image data output from the image station, and means for outputting a second request from the image station for storing the image data output in the center to the center when the control station receives a call origination signal transmitted from the image station, and the center comprises means for receiving the second request from the image station for storing the image data output in the center from the control station, and means for storing the image data transmitted from the image station when the first request is received by the means for receiving in the center.

According to the 20th aspect of the present invention, there is provided an image communication system comprising:

an image station;

a base station;

a mobile station to be connected with the base station;

a control station for controlling the system; and a center for storing data, wherein the base station comprises means for determining whether a communication between the base station and the mobile station is available when the base station receives a call origination signal output from the image station, the call origination signal designating the mobile station, and means for outputting a response signal indicating that the communication between the base station and the mobile station is not available to the control station, when the means for determining determines that the communication between the base station and the mobile station is not available, the control station comprises means for receiving the response signal indicating that the communication between the base station and the mobile station is not available from the base station, and means for outputting an instruction for storing an image data in the center to the center when the response signal indicating that the communication between the base station and the mobile station is not available is received by the means for receiving, and the center comprises means for receiving the instruction for storing the image data in the center from the control station, and means for storing the image data transmitted from the image station when the instruction is received by the means for receiving.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a block diagram showing part of a mobile station according to another embodiment of the present invention;

FIG. 5 is a block diagram showing part of a mobile station according to still another embodiment of the present invention;

FIG. 6 is a view showing a telephone directory in the mobile station according to the embodiment of the present invention;

FIG. 9 is a view for explaining a center absence record operation when communication with the mobile station is impossible.

DETAILED DESCRIPTION OF THE INVENTION

Figure 1:
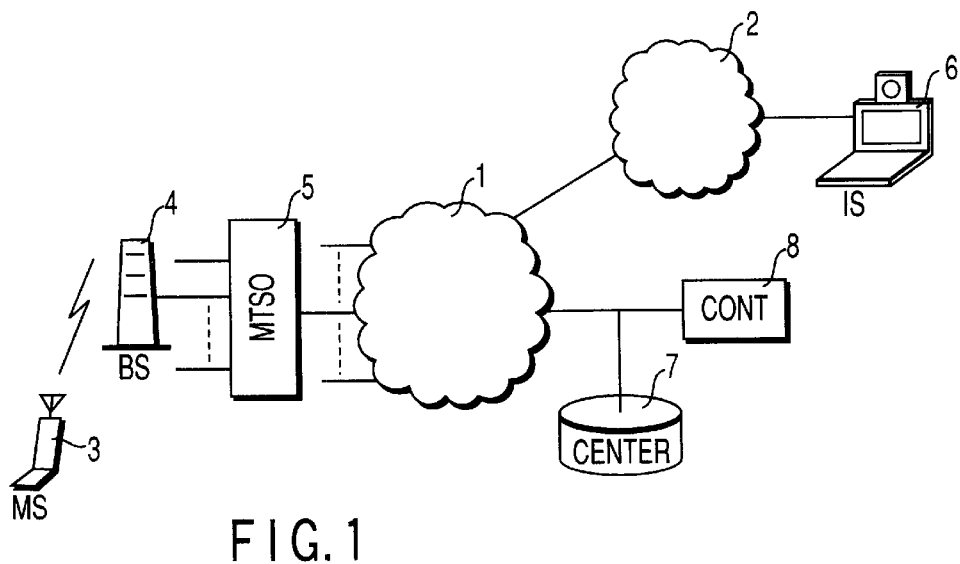
FIG. 1 is a view for explaining an image communication system according to an embodiment of the present invention.

An embodiment of the present invention will be described with reference to the accompanying drawing. FIG. 1 is a view for explaining a mobile communication system. A mobile telephone switching office (MTSO) 5 is connected to one of a plurality of lines connected to a telephone network 1. The MTSO 5 is connected to a plurality of base stations (BS) 4 via cables and has a function of switching them. The base station 4 is connected to a mobile station (MS) 3 via a radio channel.

The telephone network 1 is also connected to a mobile communication control station (CONT) 8 and center 7. The telephone network 1 is also connected to a telephone network 2. The telephone network 2 is connected to an image station (IS) 6.

Figure 2:
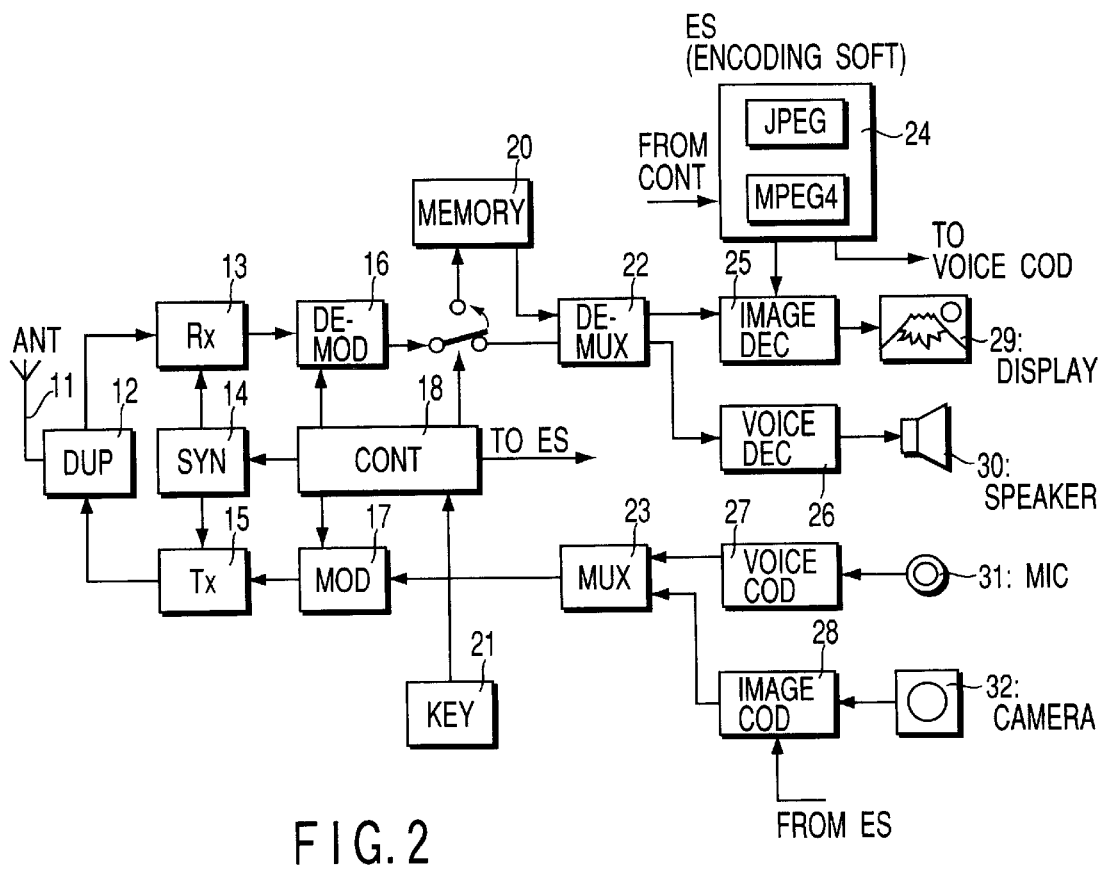
FIG. 2 is a block diagram showing a mobile station according to the embodiment of the present invention.

The concrete arrangement and control of a mobile station having the function of the present invention will be described. FIG. 2 shows the arrangement of the mobile station. A high-frequency section connected to an antenna has the same arrangement as that of a conventional mobile station. More specifically, on the basis of a local oscillation signal from a synthesizer (SYN) 14, a receiver (RX) 13 receives a signal from an antenna (ANT) 11 via a duplexer (DUP) 12, frequency-converts the signal, and outputs a converted low-frequency signal (baseband signal). The baseband signal is demodulated by a demodulator (DEMOD) 16. Processing of the demodulated signal will be described later.

In the transmission system, a baseband signal from a multiplexer (MUX) 23 (to be described later) is modulated by a modulator (MOD) 17. The modulated signal is frequency-converted into a high-frequency signal by a transmitter (TX) 15 on the basis of a local oscillation signal from the synthesizer (SYN) 14. The converted high-frequency signal is transmitted from the antenna 11 through the duplexer 12.

A controller (CONT) 18 controls not only the frequency of the local oscillation signal that is supplied from the synthesizer (SYN) 14 but also the modulator/demodulator and other sections.

In the reception system, the demodulated signal is supplied to a demultiplexer 22 via a switch 19. When the switch 19 is switched by a control signal from the controller 18, the demodulated signal is stored in a memory 20.

The demodulated signal contains, as a signal currently received, (1) only voice data, (2) only image data, or (3) multiplexed data of voice data and image data. In cases (1) and (2), the demultiplexer 22 passes the input demodulated signal. In case (3) wherein voice data and image data are multiplexed, the multiplexed data is demultiplexed by the demultiplexer 22 to reproduce the data.

Voice data output from the demultiplexer 22 is input to a voice decoder (VOICEDEC) 26, decoded into a voice PCM signal, and output from a speaker 30 as a voice. Image data output from the demultiplexer 22 is input to an image decoder (IMAGEDEC) 25, decoded into an image PCM signal, and output to a display 29 as an image.

Encoding/decoding software 24 is supplied to the image decoder 25. Suitable encoding/decoding software is selected by detecting the communication mode contained in the transmitted signal and recognizing the image data compression scheme by the controller 18.

In the transmission system as well, a voice input from a microphone (MIC) 31 is input to the voice coder 27 as a voice PCM signal. The voice coder compresses the PCM signal and outputs it as voice data. A signal input from a camera (CAMERA) 32 is input to an image coder (IMAGECOD) 28 as an image PCM signal, compressed by the image coder, and output as image data.

As in reception, data to be transmitted includes (1) only voice data, (2) only image data, or (3) both voice data and image data. In cases (1) and (2), compressed data is passed through the multiplexer 23 and output to the modulator 17. In case (3), voice data and image data are multiplexed by the multiplexer MUX and supplied to the modulator 17 as a multiplexed signal. An input section (KEY) 21 is used by the operator to input instructions. A predetermined mode such as the absence mode is also set by the operator through the input section KEY.

As a characteristic feature of the present invention, data storage control when the absence mode is set will be described with reference to FIG. 3.

In a standby state (100), the absence mode is set by the operator (102). When a dial operation is detected in this state, a dial process is performed (104, 106). When the dial operation is not performed, it is periodically checked whether a paging signal has arrived (108). If no paging signal is detected, the above operation is repeated. Upon receiving a paging signal, a communication mode representing that the signal to be received has (1) only voice data, (2) only image data, or (3) data containing both voice data and image data associated with the paging signal is detected. Simultaneously, a calling party number is detected (110).

After detection of the communication mode and calling party number, it is recognized whether the mobile station itself supports the detected communication mode (112). For example, when the mobile station has no image decoder 25 though image data is to be transmitted as in case (2) or (3), the image data cannot be reproduced on the display 29. When the self-terminal does not support the communication mode of the received data, a signal indicating that communication is not available is transmitted to the base station, and demand for the end of communication is returned (114).

On the other hand, when the self-terminal supports the detected communication mode, a reply signal representing that the terminal supports the communication mode and the absence mode is set on the terminal side is transmitted to the base station (116).

In accordance with the communication mode, (1) only voice data is stored in a mode for only voice data mode (118, 120), (2) only image data is stored in a mode for only image data (122, 124), or (3) in neither case (1) nor (2), i.e., when voice data and image data are multiplexed and transmitted, the controller 18 supplies an instruction signal to the switch 19 to store the multiplexed signal (126). The reply message transmitted in step 116 is also determined in accordance with the communication mode. That is, (1) for only voice data, a voice message is transmitted, (2) for only image data, an image is transmitted, or (3) for both voice data and image data, both voice data and image data are transmitted as a reply message.

To reproduce the stored data, encoding software corresponding to the data compression scheme is supplied from the encoding/decoding software storage section (ES) 24. When multiplexed data in case (3) is to be reproduced, the stored multiplexed data is demultiplexed into voice data and image data by the demultiplexer 22. The voice data is supplied to the voice decoder 26, and the image data is supplied to the image decoder 25. When only voice data or image data is to be reproduced as in case (1) or (2), the stored data is passed through the demultiplexer 22 and supplied to a corresponding decoder.

Image data includes still image data and moving image data, each of which has some corresponding encoding schemes. The encoding scheme of transmitted data is also recognized by the controller (CONT) 18 in detecting a paging signal. Suitable encoding software is selected, on the basis of the recognized encoding scheme, from a plurality of encoding software applications stored in the encoding/decoding software storage section, and the selected software is supplied to the image decoder. In this example, JPEG software is prepared as still image decoding software, and MPEG4 software is prepared as moving image decoding software. These software applications can be used as common software for encoding. Hence, the controller (CONT) 18 controls to transmit the software to the image coder 28 in transmission.

In the arrangement shown in FIG. 2, when storing multiplexed data of voice data and image data, the multiplexed data is directly stored and then demultiplexed by the demultiplexer 22 for reproduction. However, the multiplexed data may be demultiplexed by the demultiplexer, and then voice data and image data before decoding may be stored. FIG. 4 shows an arrangement for this operation. FIG. 4 is different from FIG. 2 in that the output from the demodulator 16 is directly connected to the demultiplexer 22, voice data and image data as outputs from the demultiplexer 22 are connected to the voice decoder 26 and image decoder 25 through switches 19b and 19a, respectively. When multiplexed data of voice data and image data is transmitted in the absence mode, the controller 18 recognizes it and controls the switches 19a and 19b to store demultiplexed voice data and image data and timing data for the two data in the memory 20. More specifically, header information representing time is added to the head of each of the voice data and image data, and the voice data and image data are stored in this state.

To store the received data, the multiplexed signal may be demultiplexed, decoded into a PCM signal, and then stored. FIG. 5 shows an arrangement for this processing. FIG. 5 is different from FIG. 4 in that the demultiplexer 22 is directly connected to the voice decoder 26 and image decoder 25, the voice decoder 26 and speaker 30 are connected through a switch 19d, and the image decoder 25 and display 29 are connected through a switch 19c. When multiplexed data of voice data and image data is transmitted in the absence mode, the controller 18 recognizes it and controls the switches 19c and 19d to store demultiplexed voice PCM data and image PCM data in the memory 20.

Three methods of storing received data have been described above. Both the first and second methods store data before decoding. These examples are advantageous because the data to be stored is compressed, and a small storage capacity is required.

In the third method of storing decoded PCM signals, the storage amount is larger than in the above two methods. However, since an already decoded signal is reproduced, the time required for reproduction is shorter than in the two examples.

Figure 3:
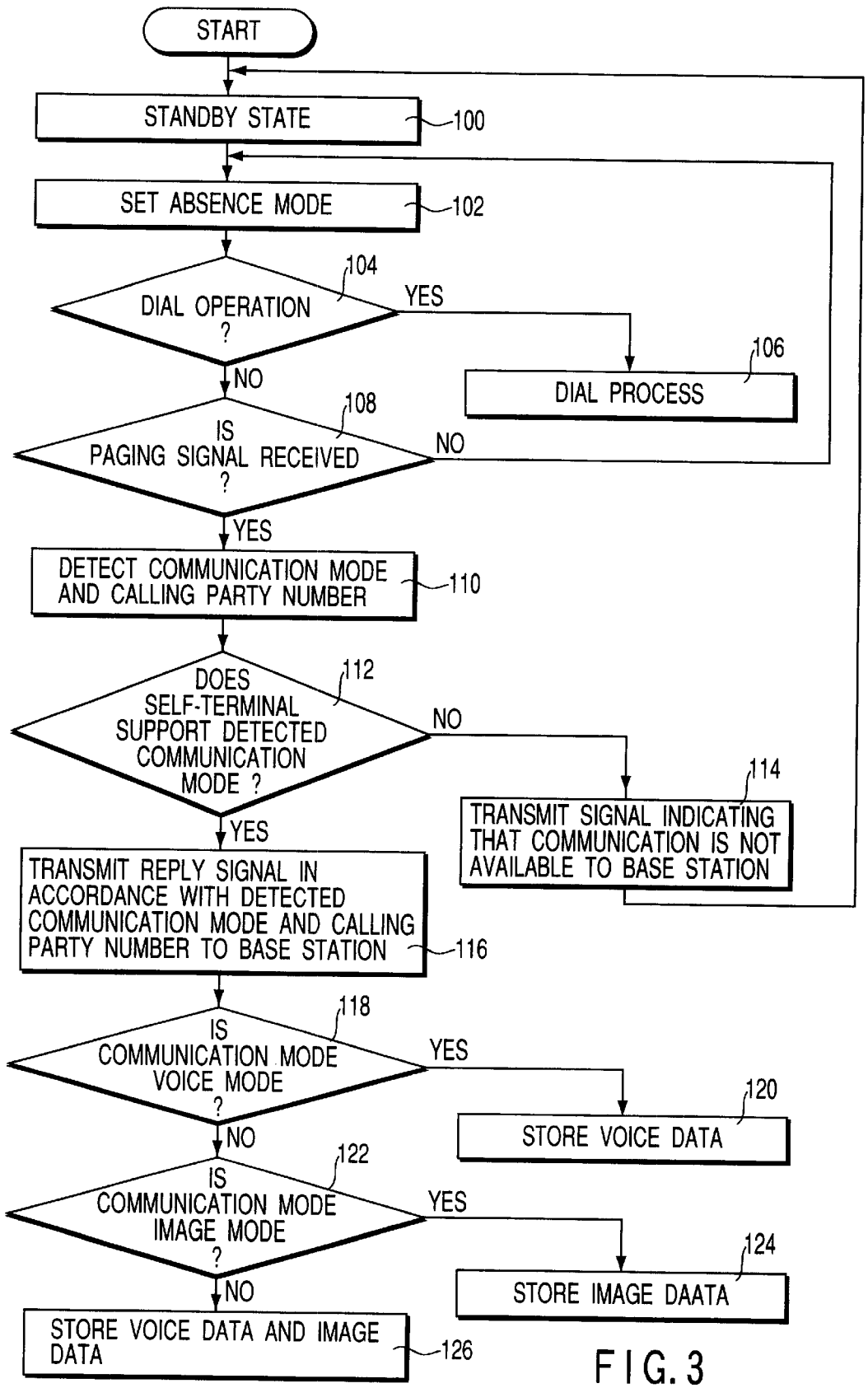
FIG. 3 is a flow chart showing control in the mobile station according to the embodiment of the present invention.

In step 116 of FIG. 3, a reply signal based on the detected calling party number is transmitted to the base station. More specifically, the response image and reply message can be changed in accordance with the calling party number.

For example, calling party numbers are classified in accordance with telephone numbers and names, and additionally, classified into private and business groups on a telephone directory as shown in FIG. 6. The response image and reply message are also changed in units of groups. For example, the types of response images are stored such that when the calling party number of the other party in the private group is detected, a "smiling face" is returned as a response image. The types of response images are stored such that when the calling party number of the other party in the business group is detected, a "normal face" is returned as a response image. The types of reply messages are also stored in the telephone directory such that a message "How are you?" is returned to the other party in the private group, and a message "This is ○○" is returned to the other party in the business group. This enables absent response on the basis of the calling party number depending on whether the other party is in the private group or business group.

Since the detected communication mode includes the compression scheme of the transmitted image data, control may be performed to transmit a response image based on the type of image compression to the calling party. This allows natural response on the transmitting side such that when still image data is received, a still image is returned, and when moving image data is received, a moving image is returned.

Figure 7:
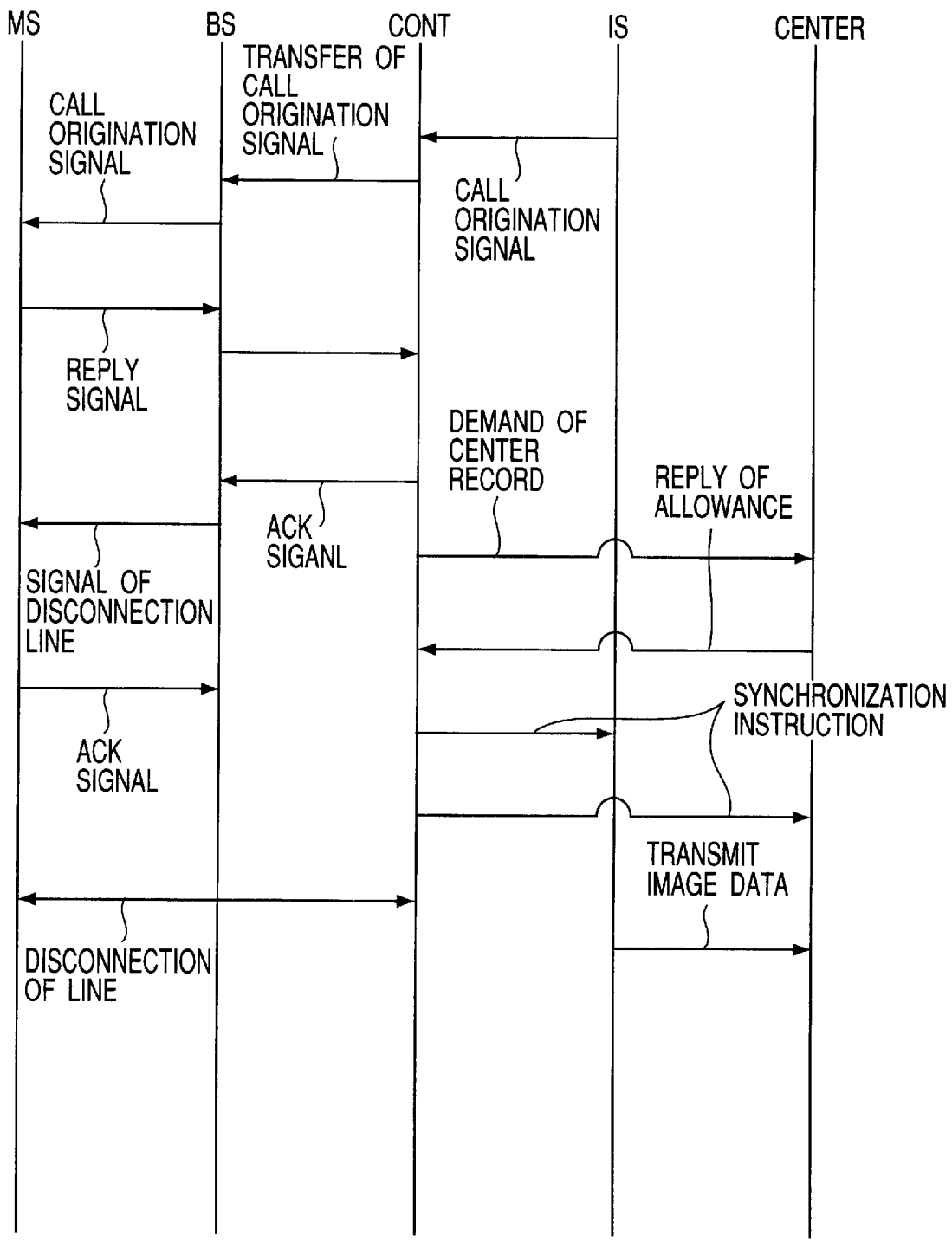
FIG. 7 is a view showing a sequence so as to explain still another embodiment of the present invention.
Figure 8:
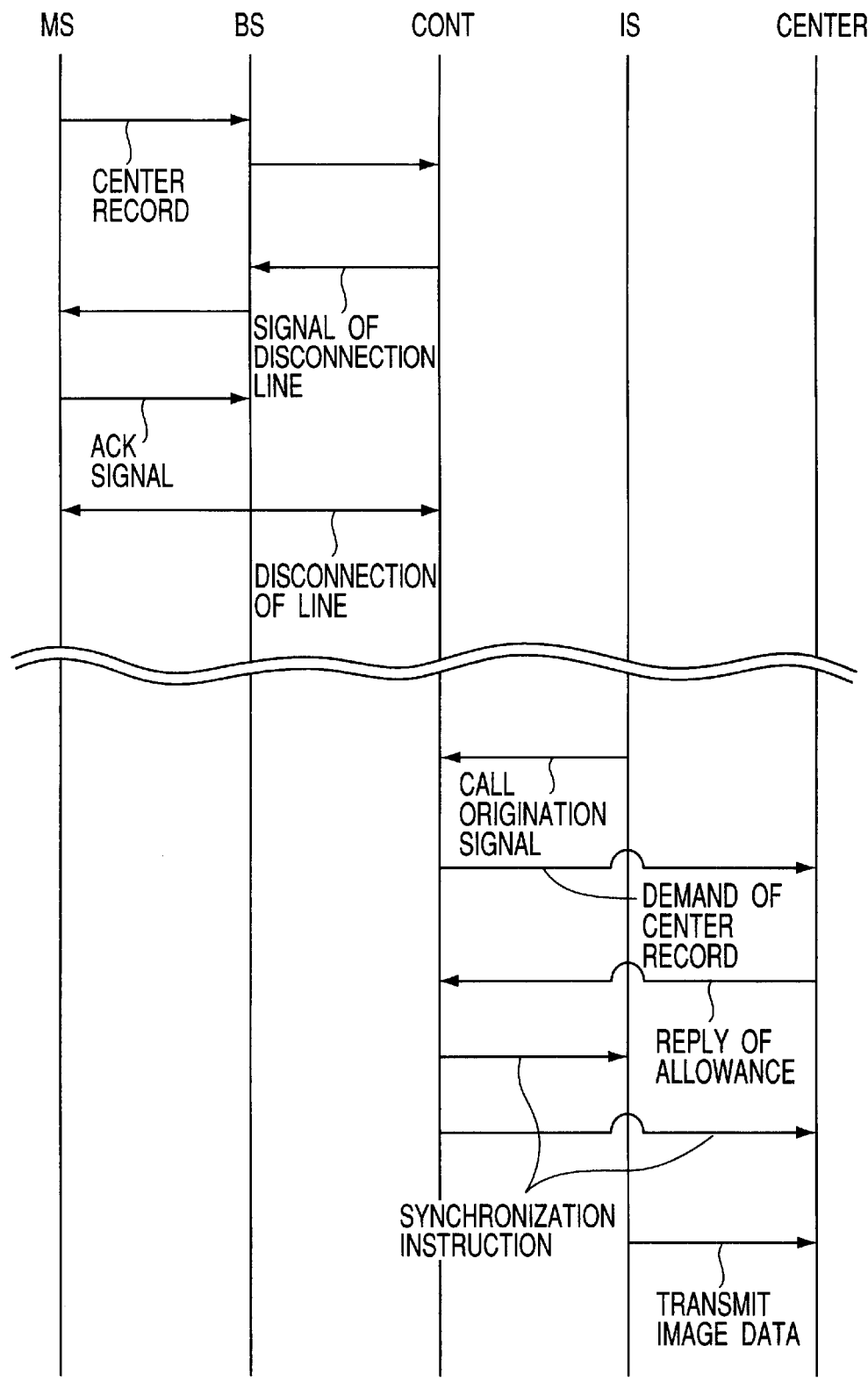
FIG. 8 is a view for explaining a center absence record operation.

In the above example, the mobile station still has a capacity for storing the received data. When the recognized capacity of the mobile station is insufficient, control may be performed to cause the center to record voice data and image data. This will be described with reference to FIG. 7. When a call for a transmission request including image data is sent from the image station (IS), the control station 8 transfers the call to the base station 4 via the telephone network 1 and MTSO 5. The base station 4 receives the call and transmits a call origination signal to the mobile station 3. The mobile station 3 receives it as a paging signal and detects, from the paging signal, information representing that image data is contained in the signal to be transmitted next, and the data amount of the image data. This information is compared with the remaining storage capacity of the storage section of the mobile station 3. If it is determined that the remaining capacity is smaller than the amount of data to be transmitted, a reply signal representing that the storage capacity is insufficient is returned to the base station 4. The base station 4 transfers the reply signal to the control station 8. The control station 8 transmits a signal of disconnection line to the mobile station 3 via the base station 4. Upon receiving the line disconnection signal, the mobile station 3 returns an ACK signal to the base station 4. Then, the line is disconnected. Parallel to this operation, the control station 8 requests the center 7 to store the image data to be sent from the image station 6. The center 7 receives this request and when ready for storage, returns a reply of allowance to the control station 8. The control station 8 sends a synchronization instruction to the image station 6 and center 7 and then transmits the image data from the image station to the center. The center records the image data.

In the above-described embodiment, when the remaining memory capacity of the mobile station 3 is insufficient, an image from the image station 6 is stored in the center 7. However, the present invention is not limited to this.

For example, when the user of the mobile station 3 wants to register the image in the center 7, the control station 8 is notified of the demand of center absence record through the base station 4. The control station 8 recognizes that the mobile station 3 requests center absence record.

When a call is sent from the image station 6 to the mobile station 3 that has set center absence record, the call origination signal is transmitted from the image station 6 to the control station 8. As described above, the control station 8 recognizes that the mobile station 3 is demanding center absence record and therefore requests the center 7 to store image data to be transmitted from the image station 6. The center 7 receives this request and, when ready for storage, returns a reply of allowance to the control station 8. The control station 8 sends a synchronization instruction to the image station 6 and center 7 and then transmits the image data from the image station to the center 7. The center records the image data.

When the mobile station 3 is out of the speech communication area of the base station 4, no call origination signal can be transmitted from the base station 4 to the mobile station 3. In this case, the base station 4 may send a center record request to the control station 8. FIG. 9 shows the time sequence for this operation.

As shown in FIG. 9, a call origination signal from the image station 6 is transferred to the base station 4 through the control station 8. If the base station 4 cannot communicate with the mobile station 3 because the mobile station 3 called is out of the speech communication area, a reply signal representing that communication is not available is returned to the control station 8.

Upon receiving the reply signal from the base station 4, the control station 8 requests the center 7 to store image data to be sent from the image station 6. The center 7 receives this request and when ready for storage, returns a reply of allowance to the control station 8. The control station 8 sends a synchronization instruction to the image station 6 and center 7 and then transmits the image data from the image station to the center. The center records the image data.

In the above description, an image is registered in the center 7. However, not only an image but also voice data or text data can be registered.

In the above description, the mobile station has been exemplified. However, the above function can be applied to an image communication terminal connected to a cable.

As has been described above, in the image communication terminal of the present invention, when the terminal user sets the absence mode, transmitted image data can be recorded in the terminal or center. For this reason, even when the user on the receiving side cannot respond to a call, the recorded image data can be reproduced and confirmed later, resulting in convenience.

In addition, since the transmitting side can always transmit an image, he/she need not call again, unlike the prior art. Furthermore, the image communication terminal can meet a request on the transmitting side, i.e., a request for allowing the information receiving side to watch image data later at a convenient time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image communication terminal comprising:

reception means for receiving a paging signal and image data associated with the paging signal;

setting means for setting a predetermined mode to store the image data received by the reception means;

storage means for storing data;

control means for storing the received image data in said storage means when the predetermined mode is set by the setting means; and detection means for detecting a communication mode included in the received paging signal, wherein said control means stores the received image data in said storage means in accordance with a method corresponding to the detected communication mode.

2. A terminal according to claim 1, wherein said control means stores voice data corresponding to the received image data in said storage means.

3. A terminal according to claim 1, wherein said control means stores voice data corresponding to the received image data in said storage means.

4. A terminal according to claim 2, wherein said control means stores, in said storage means, the received image data and the voice data in a multiplexed state.

5. A terminal according to claim 3, wherein said control means stores, in said storage means, the received image data and the voice data in a multiplexed state.

6. A terminal according to claim 3, further comprising demultiplexing means for demultiplexing the received image data and the voice data, and detecting means for detecting timing data representing a temporal relationship between the demultiplexed image data and voice data, wherein said control means stores, in said storage means, the demultiplexed image data, voice data, and the detected timing data.

7. A terminal according to claim 2, further comprising demultiplexing means for demultiplexing the received image data and the voice data, and detecting means for detecting timing data representing a temporal relationship between the demultiplexed image data and voice data, wherein said control means stores, in said storage means, the demultiplexed image data, voice data, and the detected timing data.

8. A terminal according to claim 6, wherein the demultiplexed image data and voice data are encoded.

9. A terminal according to claim 6, further comprising means for decoding the demultiplexed image data and the voice data, wherein the control means stores the decoded demultiplexed image data and the voice data in the storage means.

10. A terminal according to claim 7, wherein the demultiplexed image data and voice data are encoded.

11. A terminal according to claim 7, further comprising means for decoding the demultiplexed image data and the voice data, wherein the control means stores the decoded demultiplexed image data and the voice data in the storing means.

12. A terminal according to claim 1, wherein said detection means detects a compression method of the received Image data based on the detected communication mode, and said control means decodes the received image data based on the detected compression method.

13. A terminal according to claim 1, further comprising determination means for determining whether a data amount of the received image data associated with the paging signal is larger than a remaining capacity of said storage means, and request means for requesting a center for storing image data to store the image data associated with the paging signal when said determination means determines that the data amount of the image data is larger than the remaining capacity of said storage means.

14. A terminal according to claim 1, further comprising telephone directory storage means for storing telephone numbers and response image corresponding to each of the telephone numbers, extraction means for extracting a telephone number of a calling party from the received paging signal, and transmission means for transmitting one of the stored response images corresponding to the extracted telephone number.

15. A terminal according to claim 1, further comprising determination means for determining whether the image data associated with the paging signal is a still image or a moving image based on the received paging signal, and transmission means for transmitting a response image based on the determined type of image data associated with the paging signal.

16. An image communication system comprising:

a mobile station; and a center for storing data, wherein said mobile station comprises
reception means for receiving a paging signal and image data associated with the paging signal,
setting means for setting a predetermined mode to store the image data received by the reception means;
storage means for storing data,
determination means for determining whether a data amount of the received image data is larger than a remaining capacity of said storage means, and
request means for requesting the center for storing image data to store the received image data when said determination means determines that the data amount of the image data is larger than the remaining capacity of said storage means, and said center comprises storage means for, when said request means requests to store the image data associated with the paging signal, storing the received image data.

17. An image communication system comprising:

an image station;

a mobile station;

a control station for controlling the system; and a center for storing data, wherein the control station comprises means for receiving a first request from the mobile station for storing an image data output from the image station, and means for outputting a second request from the image station for storing the image data output in the center when the control station receives a call origination signal transmitted from the image station, and wherein the center comprises means for receiving the second request from the image station for storing the image data output in the center from the control station and means for storing the image data transmitted from the image station when the first request is received by the means for receiving in the center.

18. An image communication system comprising:

an image station;

a base station;

a mobile station to be connected with the base station;

a control station for controlling the system; and a center for storing data, wherein the base station comprises:
means for determining whether a communication between the base station and the mobile station is available when the base station receives a call origination signal output from the image station, the call origination signal designating the mobile station, and
means for outputting a response signal indicating that the communication between the base station and the mobile station Is not available to the control station, when the means for determining determines that the communication between the base station and the mobile station is not available, the control station comprises:
means for receiving the response signal indicating that the communication between the base station and the mobile station is not available from the base station, and
means for outputting an instruction for storing an image data in the center when the response signal indicating that the communication between the base station and the mobile station is not available is received by the means for receiving, and the center comprises:
means for receiving the instruction for storing the image data in the center from the control station, and
means for storing the image data transmitted from the image station when the instruction is received by the means for receiving.

* * * * *